(12) United States Patent
Ogata

(10) Patent No.: US 6,226,242 B1
(45) Date of Patent: May 1, 2001

(54) DISK RECORDING OF PLAYBACK DEVICE AND METHOD OF CONTROLLING PICKUP OF THE DEVICE

(75) Inventor: Hitoshi Ogata, Sakai (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/226,190

(22) Filed: Jan. 7, 1999

(30) Foreign Application Priority Data

Jan. 9, 1998 (JP) .................................................. 10-002972

(51) Int. Cl.$^7$ .................................................. G11B 15/52
(52) U.S. Cl. ..................... 369/47.38; 369/47.47; 369/53.3
(58) Field of Search ................ 369/32, 33, 44.27, 369/44.28, 47.38, 47.39, 47.47, 47.4, 47.41, 47.46, 47.48, 47.55, 53.3, 124.02; 360/78.07, 78.14

(56) References Cited

U.S. PATENT DOCUMENTS 5,199,019 3/1993 Matsumura et al. .

FOREIGN PATENT DOCUMENTS 2 326 969 1/1999 (GB) .
8-195045 7/1996 (JP) .

*Primary Examiner*—Paul W. Huber
(74) *Attorney, Agent, or Firm*—Armstrong, Westerman, Hattori, McLeland & Naughton, LLP

(57) ABSTRACT

A disk recording or playback device comprises a pickup movable along the rear surface of a disk, a motor for moving the pickup, arithmetic means for calculating the position of the pickup on the disk, and timer means for measuring the time taken for the movement of the pickup. Predetermined for controlling the operation of the pickup are a specified distance L1 the pickup is to be moved, and a standard period of time T1 taken for the pickup to move the distance L1. The pickup is moved the specified distance L1 by energizing the motor, and the time taken for the movement and measured by the timer means is compared with the standard time T1. The voltage to be supplied to the motor is calculated from the result of comparison. When the measured time is approximate to the standard time T1, the value of the voltage for the motor is temporarily stored in a nonvolatile memory.

7 Claims, 10 Drawing Sheets

DISK RECORDING OF PLAYBACK DEVICE AND METHOD OF CONTROLLING PICKUP OF THE DEVICE

FIELD OF THE INVENTION

The present invention relates to disk recording or playback devices by which information is recorded on or reproduced from disks serving as recording media, and a method of controlling the pickup of the device.

BACKGROUND OF THE INVENTION

FIG. 2 shows a mechanism deck 2 already known for use in such disk recording or playback devices. The deck 2 comprises a chassis 4 formed with an opening 40, a guide rod 41 extending across the opening 40, and a turntable 31 provided at an end portion of the opening 40 for rotating a disk 6. Mounted on the guide rod 41 is a pickup 3 having an object lens 30 and movable toward the turntable 31. The pickup 3 is driven by a motor M1 on the chassis 4 by way of a gear train 32 and worm 33.

Although the voltage to be applied to the motor M1 is variable to alter the drive torque thereof in the following description, the motor M1 may be so adapted that the drive torque thereof can be altered by varying the current to be supplied thereto.

The disk 6 is housed in a cartridge 60, which is provided with a slidable shutter 61. With the cartridge 60 placed on support pins 42 on the chassis 4, the shutter 61 slidingly moves to expose the lower surface of the disk 6, whereupon a beam is projected from the lens 30 of the pickup 3 for recording or playback.

With reference to FIG. 3, the disk 6 is 64 mm in outside diameter and 29 mm in inside diameter. An inner peripheral region ranging from 29 mm to 32 mm in diameter is referred to as a lead-in area A, a region ranging from 32 mm to 61 mm in diameter as a program area B, and an outer peripheral region ranging from 61 mm to 64 mm in diameter as a lead-out area. Recorded in the lead-in area A is a so-called TOC (table of contents) which is a summary of the information recorded on the disk. The pickup 3 moves along a phantom line R1 (see FIG. 3) through the center of the disk and the lens 30 on the pickup 3.

As shown in FIG. 4, the disk of the type described has grooves called pregrooves 62 and formed over the entire area of its rear surface circumferentially thereof except the lead-in area (A, in FIG. 3), the grooves extending slightly in zigzag. An address is provided every distance of movement of the pickup 3 along the zigzag groove for 13.3 msec, and is detectable even when no data is recorded on the disk. The grooves are approximately equidistantly spaced from inside outward. In place of pregrooves 62, pits (not shown) are formed in the lead-in area.

The distance of movement for 13.3 msec is termed one sector, and 36 sectors correspond to the distance of one cluster. The disk has the location of 0 cluster on a phantom circle with a diameter of 32 mm. The smallest cluster is –134 cluster on a phantom circle with a diameter of 29 mm, and the largest cluster is 2060 cluster on a phantom circle with a diameter of 64 mm.

For accurate reading of signals from the disk, it is necessary to activate a focus servo, tracking servo and speed servo. The term the "focus servo" refers to a servo for delicately moving the lens 30 of the pickup 3 upward or downward for focusing a beam from the lens 30 on the rear surface of the disk. The known astigmatism method is mainly used for the servo. The term the "tracking servo" refers to controlling the position of the beam so that the focus of the beam correctly tracks the pits in the disk. The known beam method or push-pull method is used. The term the "speed servo" refers to controlling the rotation of the disk so as to give the disk a constant linear speed, i.e., 1.4 m/sec. The servo is activated based on the difference between a reference signal on the disk and a reference signal on the circuit.

For recording or playback, a beam spot is first projected on the rear surface of the disk from the lens 30 of the pickup 3, and the focus servo is activated to move the lens upward or downward and focus the beam on the disk rear surface. The lens 30 is thereafter moved along the rear surface of the disk, and the tracking servo is activated for the beam to track the recording groove correctly, with the speed servo activated. After address data is read, the lens 30 or the pickup 3 is moved to move the beam to a desired address to read a desired signal.

In the following description, activating the focus servo, tracking servo and speed servo in sequence will be referred to as "turning on the servo," and inactivating the servos as "turning off the servo."

However, the disk recording or playback device of the type described has the following problems.

It is desired that the device be adapted for so-called random access, such that the pickup 3 is quickly movable to a desired position for the start of playback. However, if the pickup 3 is moved at an excessively high speed, the target position is not detectable accurately, for example, because the pickup 3 moves past the position. Further if the speed of movement is excessive, another problem arises, for example, in that the gear train 32 shown in FIG. 2 for transmitting power from the motor M1 to the pickup 3 gives off an increased noise.

The speed of movement of the pickup 3 varies from device to device due, for example, to fluctuations in the drive torque of the motor M1 and the load torque of the gear mechanism, with the result that some pickup 3 are too great in the speed of movement while others are too slow. Such variations become pronounced in random access.

FIG. 11 shows a closed loop proposed in view of the above problems (see JP-A-195045/1996). The closed loop has an intermediate point 90 provided between a motor M1 and a driver circuit 9 for energizing the motor M1. The load 91 due to the mechanical load of the motor M1 and to the counterelectromotive force resulting from the rotation of the motor M1 is converted as at 92 to a voltage, which is applied to the intermediate point 90, whereby a voltage corrected by considering the load 91 is applied to the motor M1 to stabilize the speed of the motor M1. However, the circuit becomes complex in construction because the motor M1 is controlled by the closed loop every revolution thereof.

SUMMARY OF THE INVENTION

An object of the present invention is to prevent the speed of movement of the pickup from varying from device to device and ensure stabilized recording or playback by a simple circuit construction.

The present invention provides a pickup control method for a disk recording or playback device comprising a pickup 3 having a lens 30 for projecting a beam onto a signal recording surface of a disk and movable along a phantom line R1 joining the center of the disk and the lens 30, a motor M1 for moving the pickup 3, arithmetic means for calculating the position of the pickup 3 on the disk from data read by the pickup 3, and timer means 13 for measuring the time taken for the movement of the pickup 3.

Predetermining for controlling the operation of the pickup 3 are a specified distance L1 the pickup 3 is to be moved and a standard period of time T1 required for the movement over the distance L1.

First, the motor M1 is energized with a voltage or current of given value a first to move the pickup 3 the specified distance L1, the time taken for the movement is measured by the timer means 13, and the ratio of the measured movement time to the standard time T1 is calculated.

The voltage or current b to be supplied to the motor M1 is calculated from the ratio and the value a to approximate the pickup movement time to the standard time T1, and the voltage or current value b for the motor M1 is temporarily stored when the movement time is approximate to the standard time T1. The voltage or current of the stored value b is supplied to the motor M1 when the pickup 3 is to be moved subsequently.

According to the control method of the invention, the pickup 3 of every device is moved, the voltage or current value for moving the pickup 3 is corrected based on the time taken for the movement, and the corrected voltage or current value is temporarily stored. The voltage or current of the stored value b is supplied to the motor when the pickup 3 is to be moved again.

Thus, the voltage or current value to be applied to the motor M1 for the pickup 3 is determined for every device in view of load fluctuations to eliminate the difference between devices in recording or playback start time. Further because the voltage or current of stored value is supplied to the motor M1 to control the operation of the pickup 3, open-loop control is provided by a simple circuit construction.

DESCRIPTION OF THE PREFERRED EMBODIMENTS

[First Embodiment]

An embodiment of the invention will be described below in detail with reference to the drawings concerned. The same disk as in the prior art is used.

Figure 1:
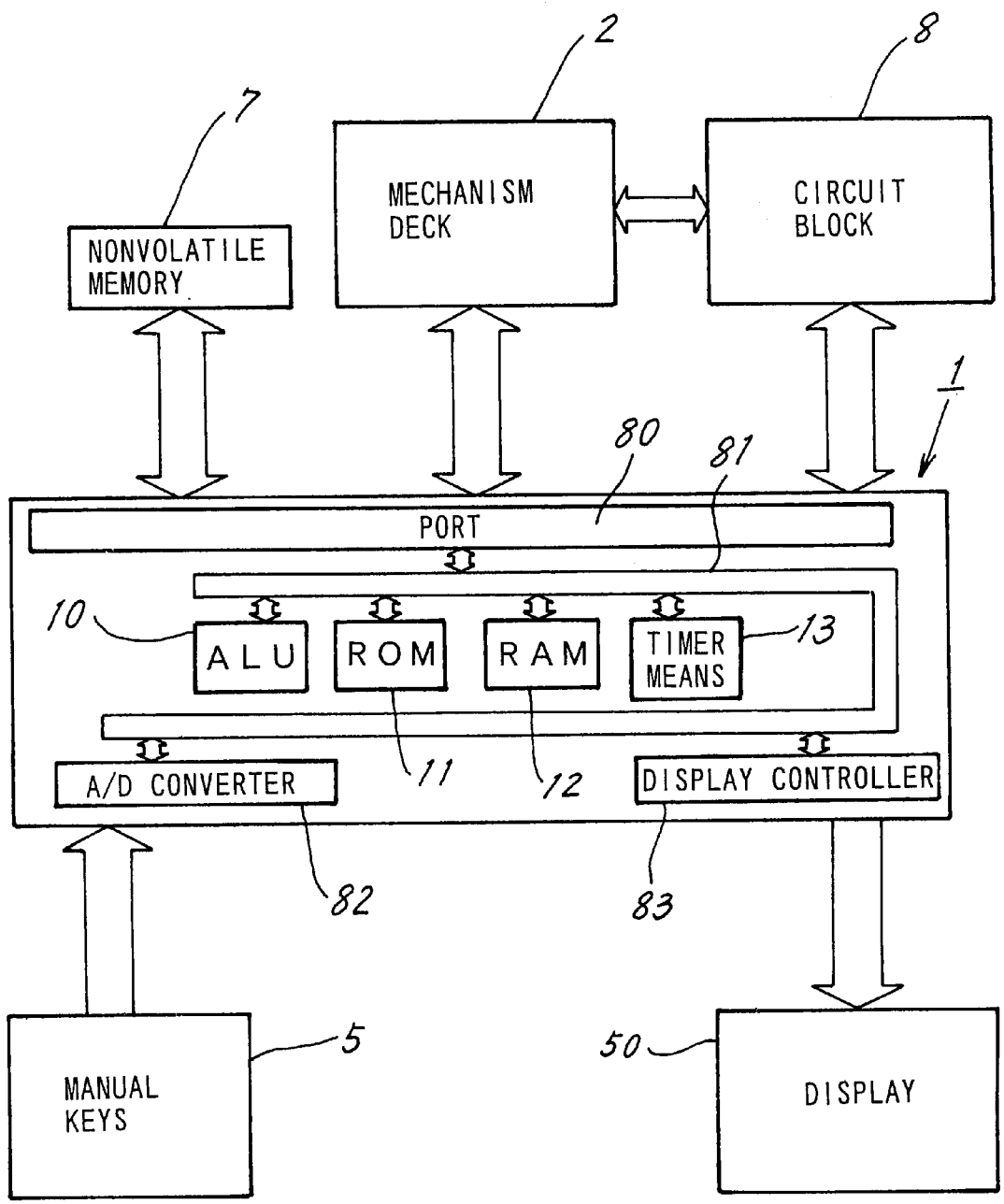
FIG. 1 is a block diagram showing the interior construction of a disk recording or playback device.
Figure 2:
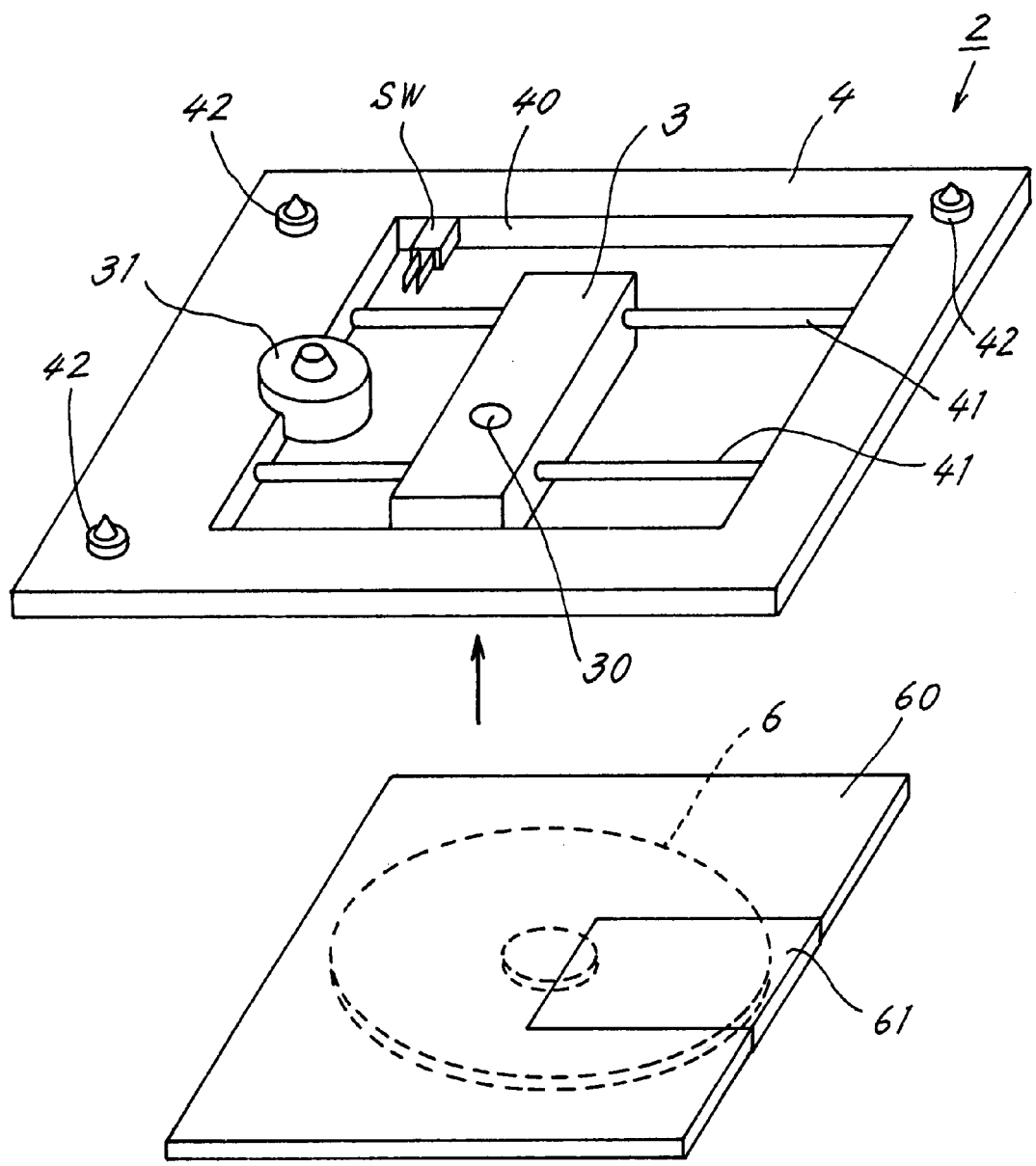
FIG. 2 is a perspective view of a mechanism deck.

FIG. 1 is an overall block diagram showing a disk recording or playback device. The device has connected to a microcomputer (hereinafter referred to as the "computer") 1 inside thereof a nonvolatile memory 7, mechanism deck 2, circuit block 8, manual keys 5 to be manipulated by the user and a display 50 for showing the operating state of the device. The mechanism deck 2 has the same construction as the conventional one shown in FIG. 2.

The computer 1 has incorporated therein an arithmetic and logic unit (hereinafter referred to as "ALU") 10, ROM 11 having stored therein an operating program, RAM 12 for storing the voltage value to be described later and timer means 13 for measuring elapsed time, which are connected by a bus line 81. The nonvolatile memory 7, mechanism deck 2 and circuit block 8 are connected via ports 80 to the bus line 81. The display 50 is connected to the bus line 81 via a display controller 83, and the manual keys 5 are connected to the line 81 via an A/D converter 82. The circuit block 8 comprises a signal compression-expansion circuit of the ATRAC (Adaptive Transform Acoustic Coding) type standardized for use in such disk recording or display devices, and the circuits of focus servo, tracking servo and speed servo described, and is electrically connected to the mechanism deck 2. As will be described later, the nonvolatile memory 7 has stored therein the voltage value to be applied to the motor M1 for driving the pickup 3.

When disk recording or playback devices are produced in quantities, the speed of movement of the pickup 3 varies from device to device due to fluctuations in load. To reduce the variations, the present embodiment provides control in the mode shown in the flow chart of FIG. 5 according to the program stored in the ROM 11. For the control, a specified voltage a is applied to the motor M1 first to measure the time taken from the pickup 3 to move between desired two points A1 and B1 on the disk 6. The measured time is then compared with a standard period of time to determine the optimum voltage to be supplied to the motor M1.

[Control Procedure]

Figure 3:
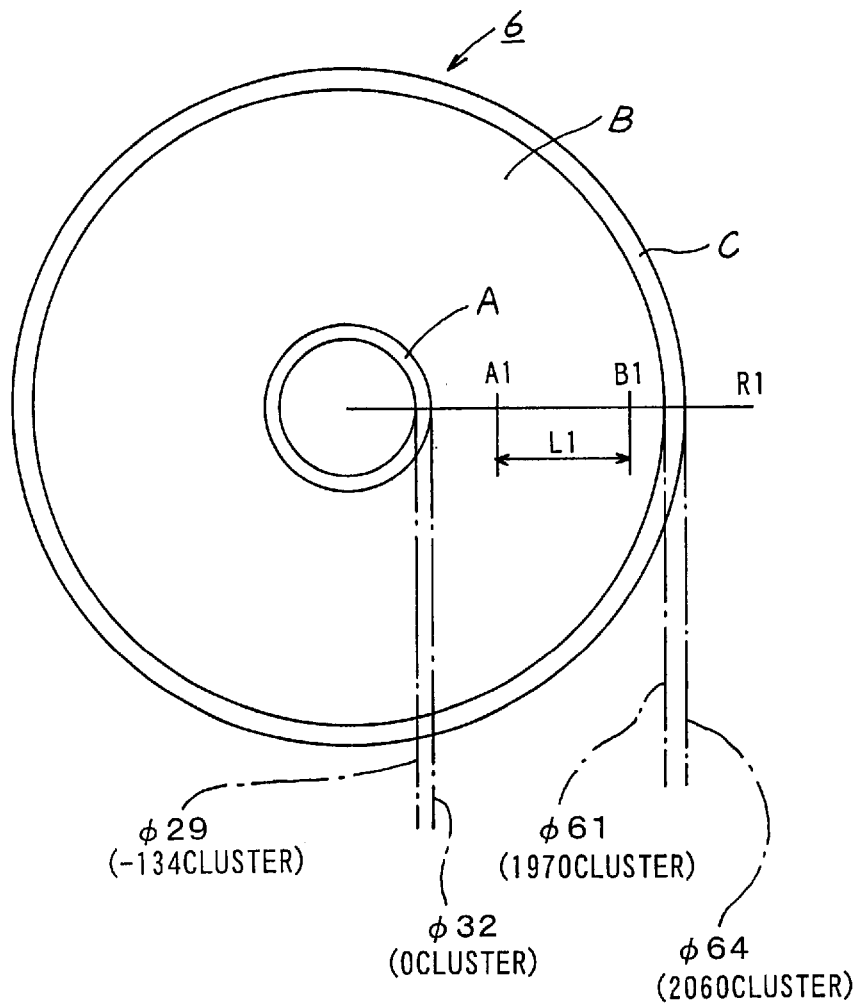
FIG. 3 is a plan view of a disk.
Figure 4:
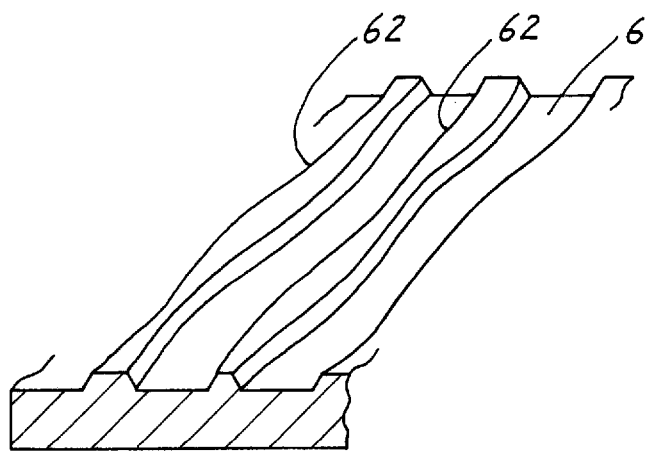
FIG. 4 is a perspective view of pregrooves in the disk.

With reference to FIG. 3, the position A1 and the position B1 external of A1 are predetermined on the disk. For example, the position A1 is a position near 100 cluster and is more specifically slightly outward of the TOC area. The position B1 is a position near 1000 cluster. The distance between A1 and B1 is represented by L1.

First, the pickup 3 is moved to the predetermined position A1 (see FIG. 3) on the disk (S1). This movement is effected while checking addresses on the disk, with a beam projected on the disk rear surface and with the servo turned on. The servo is turned off after the pickup 3 has reached A1.

Next, the ALU 10 sets the motor M1 for a drive voltage of standard value a (S2). The term "standard voltage" refers to a voltage sufficient to move the pickup 3 at a speed not excessively high. If a voltage, for example, of 4 to 6 V is empirically found necessary for moving the pickup 3, the standard voltage value is an intermediate value of 5 V.

After the voltage value a has been set, the timer means 13 is actuated for time measurement (S3). The voltage of value a is supplied to the motor M1 to move the pickup 3 outward. The ALU 10 detects the distance of movement from a tracking error signal obtained from the reflected light from the disk rear surface or the angle of rotation of the motor M1.

Upon the pickup 3 reaching the position B1 (see FIG. 3), the pickup 3 is halted (S4). The servo is turned on, the address of the point where the pickup 3 is halted is recognized, and the servo is turned off. The timer means 13 is brought out of operation, and the time required for the movement of the pickup 3 is measured (S5).

The drive torque of the motor M1 varies by altering the voltage to be supplied to the motor M1, varying the speed of movement of the pickup 3. The voltage supplied to the motor M1 is approximately in direct proportion to the speed of movement of the pickup 3. The supply voltage is altered to vary the speed of movement of the pickup 3 in the present mode of control.

The ROM 11 has prestored therein a standard period of time T1 taken for the pickup 3 to move from the position A1 to the position B1. The standard movement time T1 is an average value determined for many lots of devices of the same kind by applying the voltage of value a to the motor M1 and measuring the time taken for the pickup 3 to move from A1 to B1.

The ALU 10 then calculates the ratio of the time measured by the timer means 13 in step S5 to the standard movement time T1, and multiplies the ratio by the standard voltage value a to calculate a voltage value b (S6). Since the supply voltage to the motor M1 is approximately in direct proportion to the speed of movement of the pickup 3, the voltage value b is expressed by:

$$b = a \times \text{measured time} / \text{standard time T1}.$$

If the measured time is longer than the standard time T1, the voltage to be supplied to the motor M1 needs to be raised since the load on the motor M1 is greater, whereas if the measured time is shorter than the standard time T1, the voltage supply to the motor M1 must be decreased since the load on the motor M1 is smaller. The ALU 10 stores the voltage value b thus corrected in the nonvolatile memory 7. (S7).

Every time the pickup 3 is to be moved subsequently, this voltage value b is retrieved from the memory 7, and the voltage of value b is supplied to the motor M1. The voltage value is altered, for example, by known PWM control. The ALU 10 is caused to stored the voltage value b in the nonvolatile memory 7 in the device manufacturing process by the workman feeding a signal to the ALU 10 using manual keys 5.

When disk recording or playback devices are manufactured in quantities, the pickup movement time varies from device to device owing, for example, to load fluctuations due to the degree of accuracy with which the components of the mechanism are assembled. Accordingly some devices are slow or quick in starting recording or playback after the device is loaded with the disk. According to the present embodiment, however, the voltage to be supplied to the motor M1 is determined for every device as described above. This eliminates variations in the time elapsed until recording or playback is started after the loading of the disk.

The voltage value b may be stored in the RAM 12 instead of the nonvolatile memory 7. In this case, the voltage value b is not stored in the device manufacturing process but is automatically stored while the device is in usual use after the device is delivered to the user.

While the device is used by the user over a long period of time, the drive torque of the motor M1 and the load of components of the mechanism are likely to increase with time. Even if the voltage value b is set at the time of shipment in this case, the pickup movement time increases. However, when the voltage supply to the pickup 3 is determined every time the device is to be used, this precludes an increase in the pickup movement time due to variations with time.

With the device described above, the time taken for the pickup 3 to move a specified distance is measured to determine the voltage for the pickup drive motor M1 from the measured time, whereas the voltage for the motor M1 may be determined alternatively from the time taken for the pickup 3 to move between the addresses of optional two points.

[Second Embodiment, Repetition of Control Operation]

Figure 5:
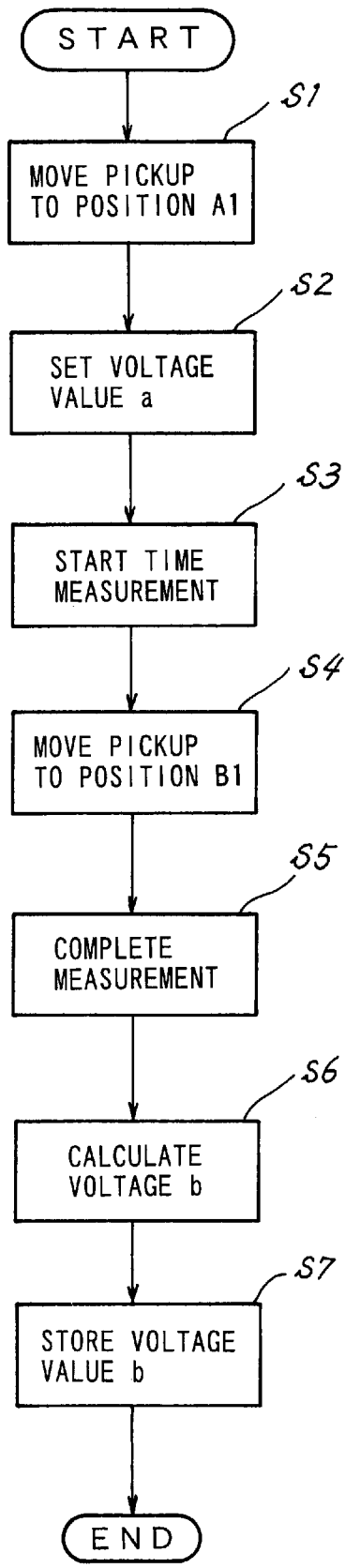
FIG. 5 is a flow chart showing a mode of controlling a pickup.
Figure 9A:
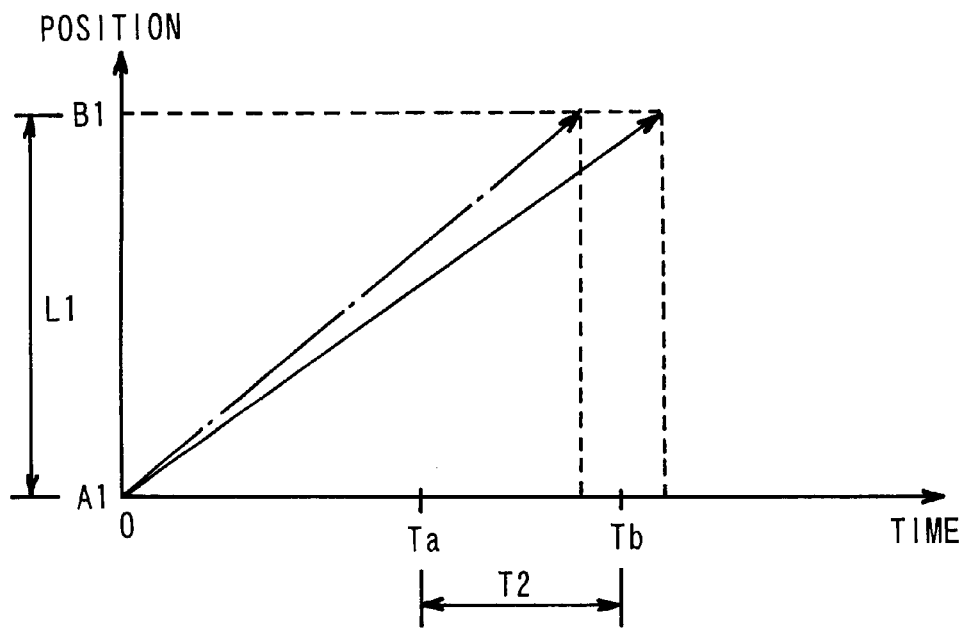
FIGS. 9A and 9B are diagrams showing a procedure for setting the pickup for a movement time within a target range T2, FIG. 9A showing a case wherein the time taken for initial movement is longer than T2, FIG. 9B showing a case wherein the time taken initial movement is shorter than T2.
Figure 9B:
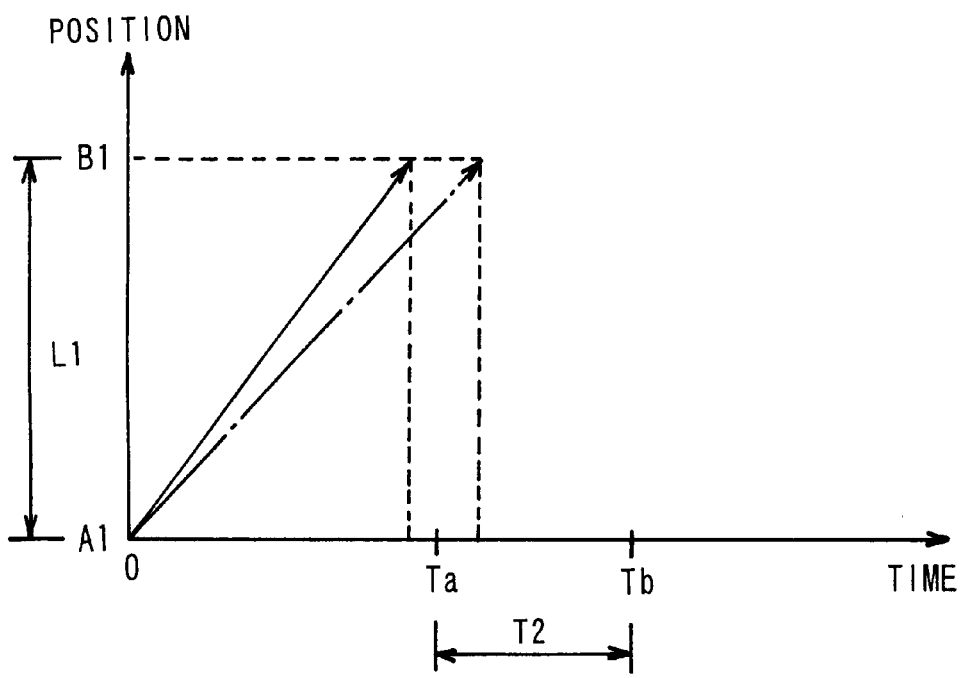

According to the flow chart of FIG. 5, the corrected voltage to be supplied to the motor M1 is determined by a single calculation, whereas the voltage may be determined alternatively by repeating the control operation of measuring the time taken for the pickup 3 to move a specified distance and varying the supply voltage for the motor M1 based on the result of measurement. This control operation is shown in the flow chart of FIG. 6. Predetermined for this control operation is a target range T2 of permissible variations in the time taken for the pickup 3 to move the distance L1 between positions A1 and B1 as shown in FIGS. 9A and 9B. The control operation is repeated until the movement time is included within the target range T2. The target range T2 is determined by measuring the pickup movement time for many lots of devices of the same kind and obtaining the standard distribution of the time measurements. The upper limit value of the target range T2 will be referred to as Tb, and the lower limit value thereof as Ta.

The control procedure will be described below. First, the pickup 3 is moved to the position A1 on the disk 6 (S10), and the pickup 3 is then set for a standard voltage value a for driving (S11). After the timer means 13 is started for time measurement (S12), the pickup 3 is moved to the position B1. Completion of time measurement then follows (S13). These steps are the same as in the flow chart of FIG. 5.

Subsequently, an inquiry is made as to whether the time taken for the pickup 3 to move the distance L1 is beyond the upper limit Tb of the target range T2 (S14). If the pickup movement time is beyond the upper limit Tb of the target range T2 as indicated by an arrow in solid line in FIG. 9A, this shows that the speed of movement of the pickup 3 is low, and the voltage to be supplied to the motor M1 is corrected to a higher value by a unit voltage, e.g., a fraction of a volt (S15). The pickup 3 is returned to the position A1 again, and the corrected voltage is supplied to the motor M1 as indicated in a chain line. This operation is repeated, and when the resulting movement time is found to be within the target range T2 (S16), the voltage value b concerned is stored in the nonvolatile memory 7 (S18).

Alternatively if the pickup movement time is less than the lower limit Ta of the target range T2 as indicated in a solid line in FIG. 9B, this reveals that the speed of movement of the pickup 3 is excessive, so that the voltage to be supplied to the motor M1 is reduced by a unit voltage (S17). The pickup 3 is returned to the position A1 again, and the corrected voltage is supplied to the motor M1 as indicated in a chain line. This operation is repeated. When the resulting movement time is found to be within the target range T2, the voltage value b concerned is stored in the nonvolatile memory 7 (S18), whereby the control operation is completed.

When the pickup 3 is to be moved again, the voltage value b is retrieved from the nonvolatile memory 7, and the voltage of this value is applied to the motor M1. The voltage value b may be stored in the RAM 12 instead of the memory 7. According to the flow chart of FIG. 6, the time taken for the pickup 3 to move a specified distance is measured to determine the corrected voltage for the pickup drive motor M1 from the measured time, whereas the voltage for the motor M1 may be determined alternatively from the time taken for the pickup 3 to move between the addresses of optional two points.

In this way, the pickup 3 can be controlled more accurately by predetermining the target range T2 and repeating the control operation until the pickup movement time becomes included within the range T2. Thus, the movement time can be determined more accurately by the mode of control shown in the flow chart of FIG. 6 than by the control mode of the flow chart of FIG. 5.

[Third Embodiment]

Figure 7:
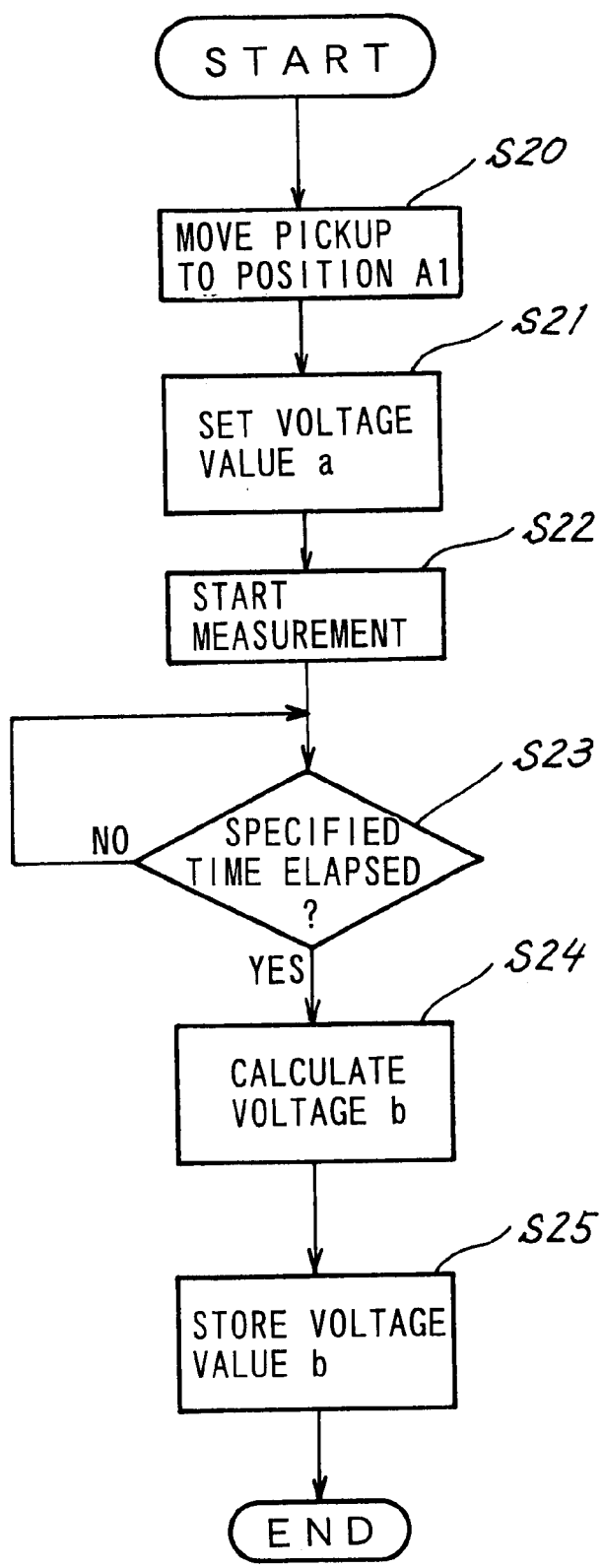
FIG. 7 is a flow chart showing another mode of controlling a pickup.

According to this embodiment, a specified period of time T3 is stored in the ROM 11 in advance, and the voltage to be supplied to the motor M1 is determined from the distance the pickup 3 moves during the specified time T3. Also predetermined are a standard drive voltage a and a standard distance L1 to be covered during the specified time T3 (see FIG. 3). The standard distance L1 is an average value determined for many lots of devices of the same kind by measuring the distance the pickup 3 moves within the specified time T3 when a voltage of value a is supplied to the motor M1. Thus the standard for determining the voltage for the motor M1 is changed from the pickup movement time in the control mode of FIG. 5 to the distance of movement of the pickup 3 as specifically shown in the flow chart of FIG. 7.

The pickup 3 is first moved to a position A1 (S20), the pickup is set for the drive voltage value a (S21), and the distance the pickup 3 moves within the specified time T3 is measured (S22, S23).

In this mode of control, the voltage of value b to be supplied to the motor M1 is given by:

b=a×standard distance L1/distance of movement

The value b is calculated in step S24. If the distance of movement is great, the load on the motor M1 is small, so that the voltage to be supplied to the motor M1 needs to be reduced. If the distance is short, the load on the motor M1 is great, and the voltage to be supplied to the motor M1 must be raised. The voltage value b is stored in the nonvolatile memory 7 or RAM 12 (S25). The distance of movement and the standard distance L1 may of course be replaced by intervals between addresses on the disk.

[Fourth Embodiment]

Figure 8:
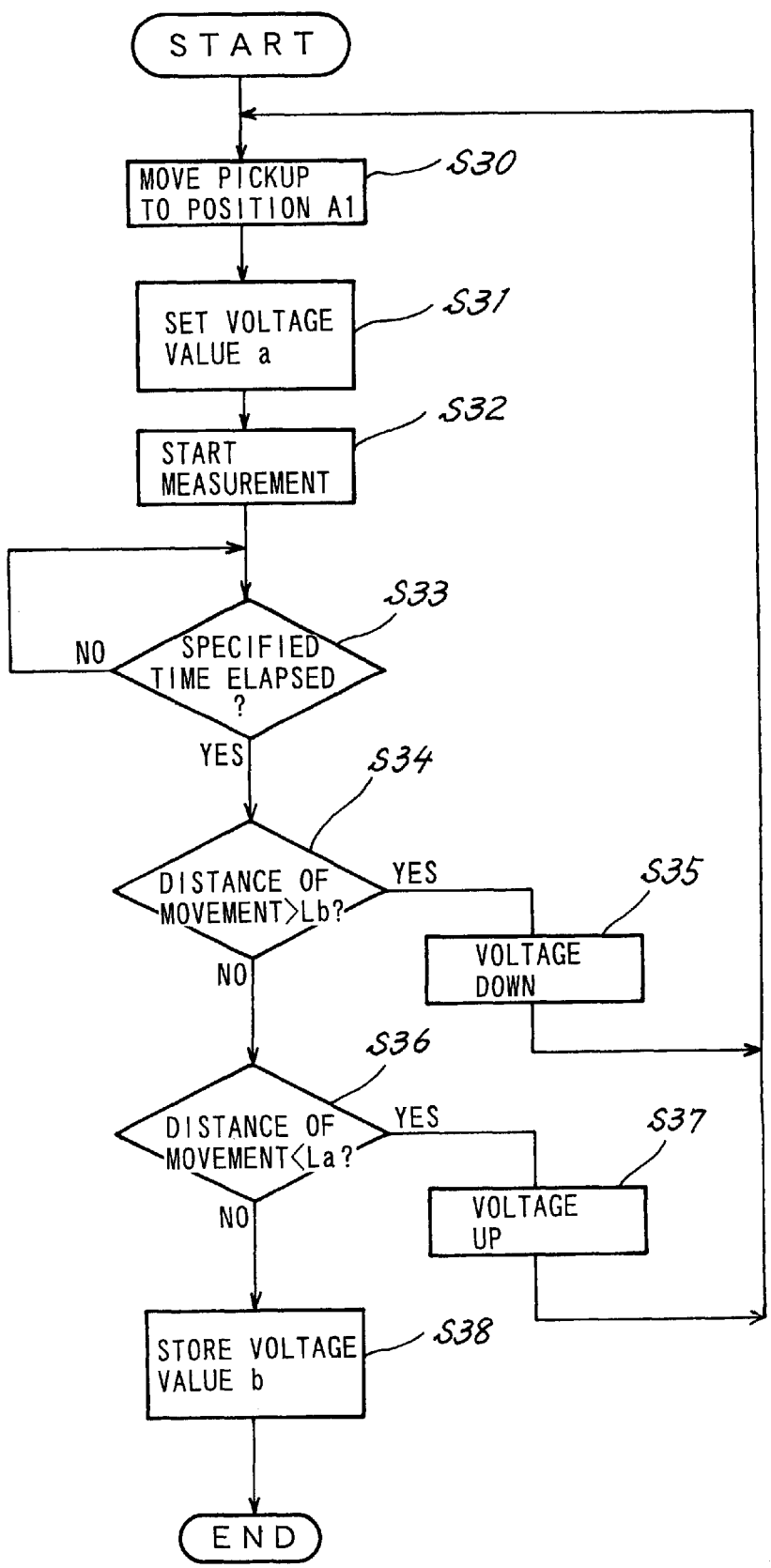
FIG. 8 is a flow chart showing another mode of controlling a pickup.
Figure 10A:
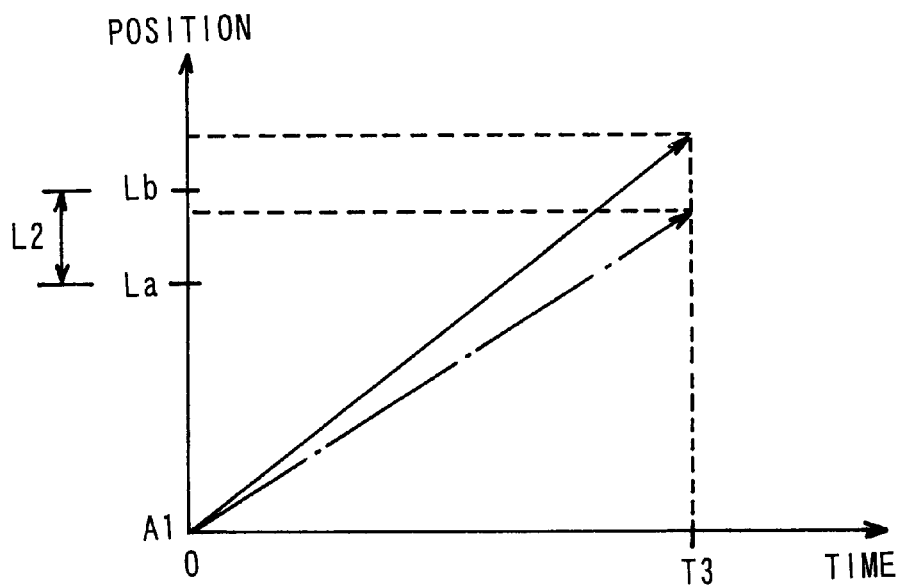
FIGS. 10A and 10B are diagrams showing a procedure for setting the pickup for a distance of movement within a target range L2, FIG. 10A showing a case wherein the distance of initial movement is beyond L2, FIG. 9B showing a case wherein the distance of initial movement is shorter than L2.
Figure 10B:
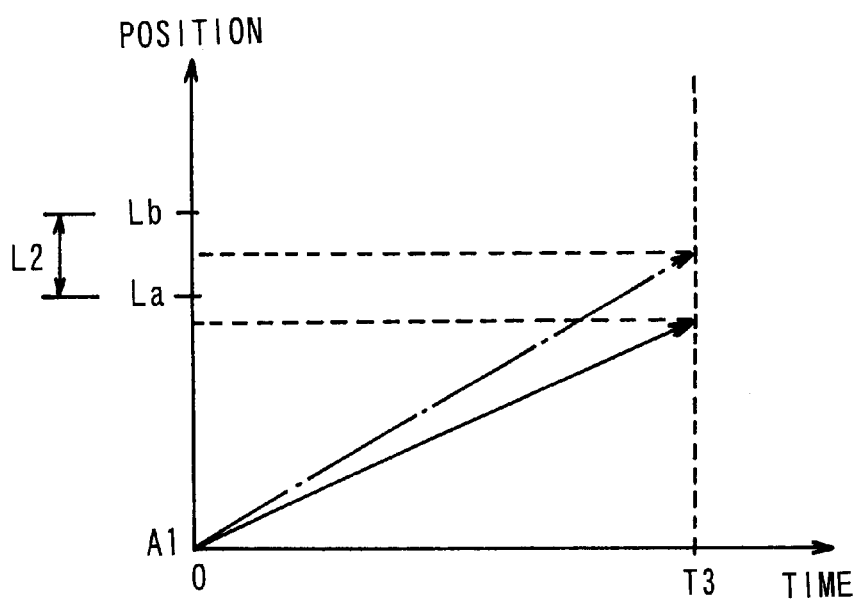
Figure 11:
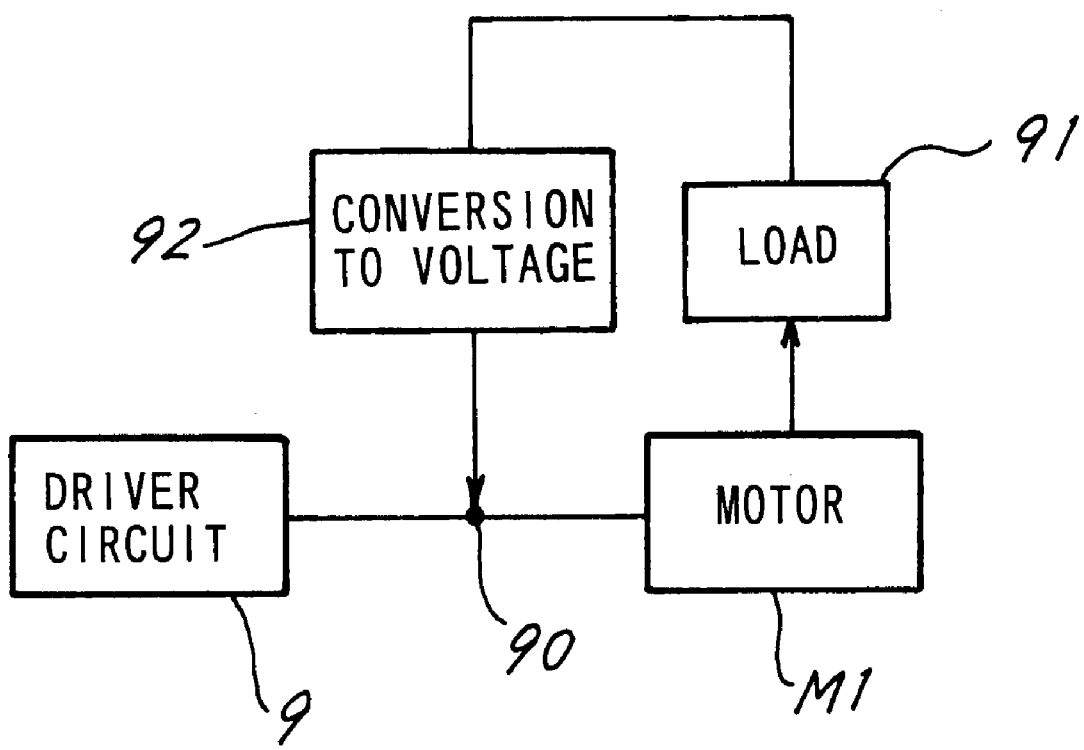
FIG. 11 is a block diagram showing a conventional mode of controlling the pickup.

As shown in the flow chart of FIG. 8 and FIGS. 10A and 10B, a target range L2 of permissible variations in the distance the pickup 3 moves within a specified period of time T3 is predetermined. A control operation is repeated until the distance of movement is included within the target range L2. The target range L2 is determined from a standard distribution of distance measurements obtained for many like devices by measuring the distance the pickup 3 moves within the specified time T3 when a standard voltage a is supplied to the motor M1. The upper limit of the target range L2 will be referred to as Lb, and the lower limit thereof as La.

Figure 6:
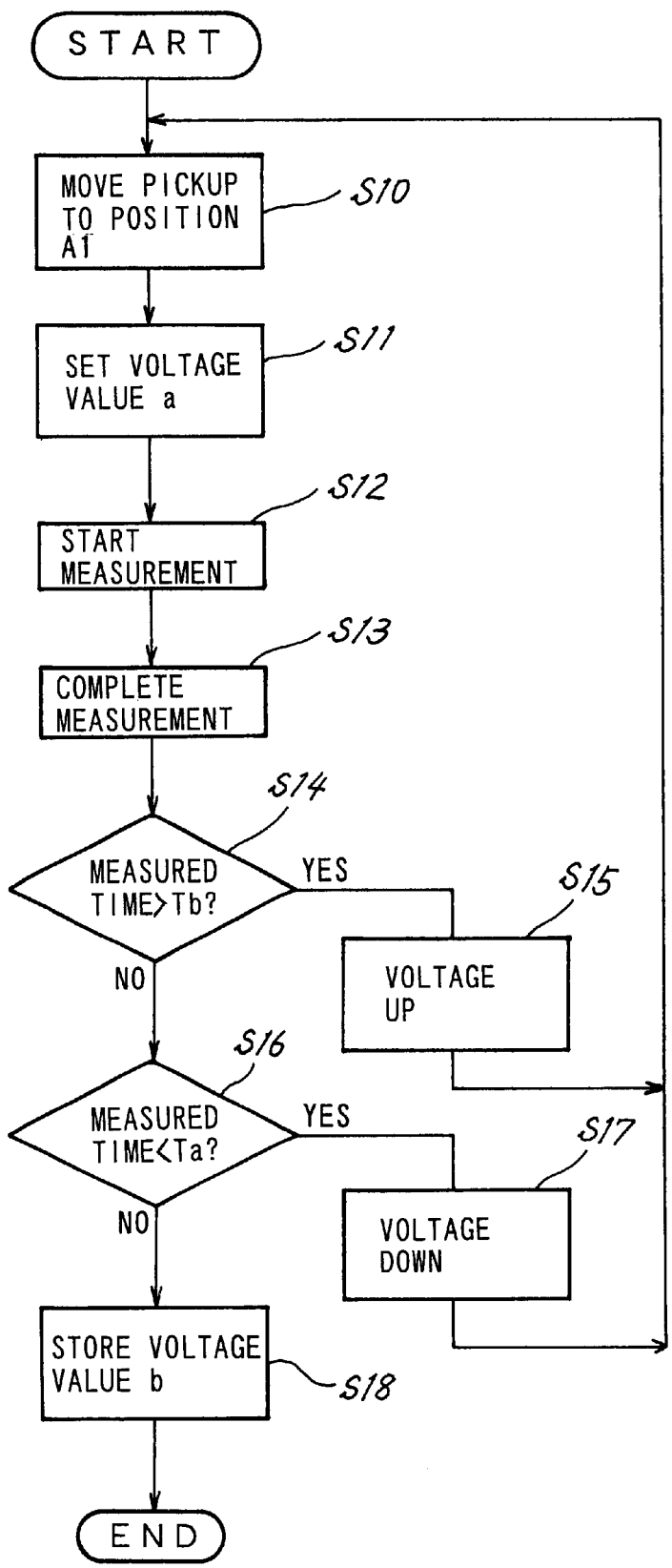
FIG. 6 is a flow chart showing another mode of controlling a pickup.

The operation shown in the flow chart of FIG. 8 corresponds to that shown in the flow chart of FIG. 6 wherein the measured time is replaced by the distance of movement.

The operation procedure will be described below. The pickup 3 is moved to a position A1 (S30) first and then set for the standard voltage value a for driving. When the timer means 13 detects lapse of the specified time T3 (S33), an inquiry is made as to whether the distance of movement of the pickup 3 is within the target range L2.

If the distance of movement of the pickup 3 is beyond the upper limit Lb of the target range L2 (S34) as shown in FIG. 10A, the speed of the pickup 3 is excessive, so that the voltage to be supplied to the motor M1 is lowered (S35). The pickup 3 is returned to the position A1 again, and the corrected voltage is supplied to the motor M1 as indicated in a chain line. This operation is repeated, and when the resulting distance of movement is found to be within the target range L2, the voltage value b concerned is stored in the nonvolatile memory 7 (S38).

Alternatively if the distance of movement of the pickup 3 is less than the lower limit La of the target range L2 (S36) as shown in FIG. 10B, the pickup 3 is too slow, so that the voltage to be supplied to the motor M1 is raised (S37). The pickup 3 is returned to the position A1 again, and the corrected voltage is supplied to the motor M1 as indicated in a chain line. This operation is repeated.

When the distance of movement of the pickup 3 is found to be within the target range L2, the voltage value b concerned is stored in the nonvolatile memory 7 or RAM 12 (S38).

The nonvolatile memory 7 generally comprises $E^2PROM$ or the like and is usually used also for storing adjustment values, for example, of servo gains and characteristics values such as coefficients of digital filters, etc. A vacant address may be utilized for storing the amount of overrun of the pickup 3.

The motor M1 described above is driven with voltage, whereas if the motor M1 is driven with current, a corrected current value may be stored in the nonvolatile memory 7 and the RAM 12.

What is claimed is:

1. A pickup control method for a disk recording or playback device comprising a pickup having a lens for projecting a beam onto a signal recording surface of a disk and movable along a phantom line R1 joining the center of the disk and the lens, a motor for moving the pickup, arithmetic means for calculating the position of the pickup on the disk from data read by the pickup, and timer means for measuring the time taken for the movement of the pickup, the method being characterized by:

predetermining a specified distance L1 the pickup is to be moved and a standard period of time T1 required for the movement over the distance L1, energizing the motor with a voltage or current of given value a first to move the pickup the specified distance L1, measuring the time taken for the movement by the timer means and calculating the ratio of the measured movement time to the standard time T1, calculating a voltage or current b to be supplied to the motor from the ratio and the value a to approximate the pickup movement time to the standard time T1 and temporarily storing the voltage or current value b for the motor when the movement time is approximate to the standard time T1, and supplying the voltage or current of stored value b to the motor when the pickup is to be moved subsequently.

2. A pickup control method for a disk recording or playback device comprising a pickup having a lens for projecting a beam onto a signal recording surface of a disk and movable along a phantom line R1 joining the center of the disk and the lens, a motor for moving the pickup, arithmetic means for calculating the position of the pickup on the disk from data read by the pickup, and timer means for measuring the time taken for the movement of the pickup, the method being characterized by:

providing addresses on the disk approximately over the entire circumference thereof and predetermining an address interval the pickup is to be moved and a standard period of time T1 required for the movement over the interval, energizing the motor with a voltage or current of given value a first to move the pickup the address interval, measuring the time taken for the movement by the timer means and calculating the ratio of the measured movement time to the standard time T1, calculating a voltage or current b to be supplied to the motor from the ratio and the value a to approximate the pickup movement time to the standard time T1 and temporarily storing the voltage or current value b for the motor when the movement time is approximate to the standard time T1, and supplying the voltage or current of stored value b to the motor when the pickup is to be moved subsequently.

3. A pickup control method for a disk recording or playback device comprising a pickup having a lens for projecting a beam onto a signal recording surface of a disk and movable along a phantom line R1 joining the center of the disk and the lens, a motor for moving the pickup, arithmetic means for calculating the position of the pickup on the disk from data read by the pickup, and timer means for measuring the time taken for the movement of the pickup, the method being characterized by:

predetermining a specified period of time T3 during which the pickup is to be moved and a standard distance L1 the pickup moves during the specified period of time T3, energizing the motor with a voltage or current of given value a first to move the pickup for the specified period of time T3 and calculating the ratio of the distance of movement during the specified time T3 to the standard distance L1, calculating a voltage or current b to be supplied to the motor from the ratio and the value a to approximate the distance of movement of the pickup to the standard distance L1 and temporarily storing the voltage or current value b for the motor when the distance is approximate to the standard distance L1, and supplying the voltage or current of stored value b to the motor when the pickup is to be moved subsequently.

4. A pickup control method for a disk recording or playback device comprising a pickup having a lens for projecting a beam onto a signal recording surface of a disk and movable along a phantom line R1 joining the center of the disk and the lens, a motor for moving the pickup, arithmetic means for calculating the position of the pickup on the disk from data read by the pickup, and timer means for measuring the time taken for the movement of the pickup, the method being characterized by:

providing addresses on the disk approximately over the entire circumference thereof and predetermining a specified period of time T3 during which the pickup is to be moved and a standard address interval the pickup moves during the specified period of time T3, energizing the motor with a voltage or current of given value a first to move the pickup for the specified period of time T3 and calculating the ratio of the address interval the pickup moves during the specified time T3 to the standard address interval, calculating a voltage or current b to be supplied to the motor from the ratio and the value a to approximate the address interval the pickup is to be moved to the standard address interval and temporarily storing the voltage or current value b for the motor when the interval is approximate to the standard, and supplying the voltage or current of stored value b to the motor when the pickup is to be moved subsequently.

5. A pickup control method for a disk recording or playback device comprising a pickup having a lens for projecting a beam onto a signal recording surface of a disk and movable along a phantom line R1 joining the center of the disk and the lens, a motor for moving the pickup, arithmetic means for calculating the position of the pickup on the disk from data read by the pickup, and timer means for measuring the time taken for the movement of the pickup, the method being characterized by:

predetermining a specified distance L1 the pickup is to be moved and a target range T2 of time taken for the movement over the distance L1, energizing the motor with a voltage or current of value a first to move the pickup the specified distance L1, then returning the pickup, measuring the time taken for the movement by the timer means and checking whether the measured movement time is within the target range T2, increasing the voltage or current to be supplied to the motor when the movement time is beyond the upper limit of the target range T2, or decreasing the voltage or current to be supplied to the motor when the movement time is less than the lower limit of the target range T2, moving the pickup again with the increased or decreased voltage or current, and performing the increasing or decreasing operation at least once to set the pickup movement time within the standard target range T2, temporarily storing the voltage or current value b for the motor when the movement time is within the target range T2, and supplying the voltage or current of stored value b to the motor when the pickup is to be moved subsequently.

6. A pickup control method for a disk recording or playback device comprising a pickup having a lens for projecting a beam onto a signal recording surface of a disk and movable along a phantom line R1 joining the center of the disk and the lens, a motor for moving the pickup, arithmetic means for calculating the position of the pickup on the disk from data read by the pickup, and timer means for measuring the time taken for the movement of the pickup, the method being characterized by:

predetermining a specified period of time T3 during which the pickup is to be moved and a target range L2 of distances the pickup moves during the specified period of time T3, energizing the motor with a voltage or current of value a first to move the pickup for the specified time T3, then returning the pickup, and checking whether the distance of movement during the specified time T3 is within the target range L2, decreasing the voltage or current to be supplied to the motor when the distance of movement is beyond the upper limit of the target range L2, or increasing the voltage or current to be supplied to the motor when the distance of movement is less than the lower limit of the target range L2, moving the pickup again with the decreased or increased voltage or current, and performing the decreasing or increasing operation at least once to set the distance of movement of the pickup within the target range L2, temporarily storing the voltage or current value b for the motor when the distance is within the target range L2, and supplying the voltage or current of stored value b to the motor when the pickup is to be moved subsequently.

7. A disk recording or playback device comprising a pickup having a lens for projecting a beam onto a signal recording surface of a disk and movable along a phantom line R1 joining the center of the disk and the lens, a motor for moving the pickup, arithmetic means for calculating the position of the pickup on the disk from data read by the pickup, and timer means for measuring the time taken for the movement of the pickup, the disk recording or playback device being characterized in that the device comprises:

a ROM having stored therein a specified distance L1 the pickup is to be moved and a standard period of time T1 required for the movement over the distance L1, an arithmetic and logic unit operable according to a program stored in the ROM, and memory means for temporarily storing the value of a voltage or current to be supplied to the motor, the arithmetic and logic unit being operable to energize the motor with a voltage or current of given value a first to move the pickup the specified distance L1, measure the time taken for the movement by the timer means and calculate the ratio of the measured movement time to the standard time T1, the unit further being operable to calculate a voltage or current b to be supplied to the motor from the ratio and the value a to approximate the pickup movement time to the standard time T1, and temporarily store the voltage or current value b for the motor when the movement time is approximate to the standard time T1, and the unit further being operable to supply the voltage or current of stored value b to the motor when the pickup is to be moved subsequently.

* * * * *

UNITED STATES PATENT AND TRADEMARK OFFICE
CERTIFICATE OF CORRECTION

PATENT NO. : 6,226,242 B1
DATED : May 1, 2001
INVENTOR(S) : Hitoshi Ogata

It is certified that error appears in the above-identified patent and that said Letters Patent is hereby corrected as shown below:

<u>Title page,</u>
Item [54], Title, change "DISK RECORDING OF PLAYBACK DEVICE AND METHOD OF CONTROLLING PICKUP OF THE DEVICE" to be -- DISK RECORDING OR PLAYBACK DEVICE AND METHOD OF CONTROLLING PICKUP OF THE DEVICE --.

Signed and Sealed this

Twenty-sixth Day of February, 2002

*Attest:*

JAMES E. ROGAN
*Attesting Officer*     *Director of the United States Patent and Trademark Office*